(12) United States Patent
Delano et al.

(10) Patent No.: US 11,356,051 B2
(45) Date of Patent: Jun. 7, 2022

(54) SOLAR POWERED CHARGING STATION

(71) Applicant: SkyHook Solar Corp, Aspen, CO (US)

(72) Inventors: Daniel Delano, Woody Creek, CO (US); William Gilmore, Aspen, CO (US); Joseph Goodman, Snowmass Village, CO (US); Chris Needham, Mountain View, HI (US); Frank Oudheusden, Mount Vernon, NH (US)

(73) Assignee: Skyhook Solar Corp., Aspen, CO (US)

( * ) Notice: Subject to any disclaimer, the term of this patent is extended or adjusted under 35 U.S.C. 154(b) by 380 days.

(21) Appl. No.: 16/736,863

(22) Filed: Jan. 8, 2020

(65) Prior Publication Data

US 2020/0220376 A1    Jul. 9, 2020

Related U.S. Application Data

(60) Provisional application No. 62/790,288, filed on Jan. 9, 2019.

(51) Int. Cl.
*H02S 10/40* (2014.01)
*H02J 7/35* (2006.01)
*H02S 10/00* (2014.01)
*H02S 40/32* (2014.01)
*H02S 20/10* (2014.01)
*H02S 40/38* (2014.01)

(52) U.S. Cl.
CPC ............ *H02S 10/40* (2014.12); *H02J 7/35* (2013.01); *H02S 10/00* (2013.01); *H02S 20/10* (2014.12); *H02S 40/32* (2014.12); *H02S 40/38* (2014.12); *H02J 2207/20* (2020.01)

(58) Field of Classification Search
CPC ........................................ H02S 10/40
USPC ........................................ 320/101
See application file for complete search history.

(56) References Cited

U.S. PATENT DOCUMENTS

| | | | | |
|---|---|---|---|---|
| 5,969,501 A | * | 10/1999 | Glidden | H02S 20/30 320/136 |
| 6,396,239 B1 | | 5/2002 | Benn et al. | |
| 6,930,237 B2 | * | 8/2005 | Mattiuzzo | F24S 30/40 136/246 |
| 7,492,120 B2 | | 2/2009 | Benn et al. | |
| 7,795,837 B1 | * | 9/2010 | Haun | H02S 10/40 320/101 |
| 7,898,212 B2 | | 3/2011 | Benn et al. | |
| 8,120,310 B2 | | 2/2012 | Littrell et al. | |

(Continued)

FOREIGN PATENT DOCUMENTS

| | | |
|---|---|---|
| CN | 102820350 | 12/2012 |
| CN | 203496746 | 3/2014 |

(Continued)

*Primary Examiner* — Jerry D Robbins
(74) *Attorney, Agent, or Firm* — Ballard Spahr LLP (57) ABSTRACT

A solar powered charging station uses photovoltaic panels to generate electrical energy for use directly and/or for storage in electrical batteries for use during night operation. The station includes parallel electrical circuits which permit the station to operate during daylight hours in the event of a failure of the battery or the battery charging system. The station is designed to provide a kit embodiment having light weight, easily transportable components. The parallel circuitry is adaptable for use with other forms of electrical power generation having a minimal carbon footprint.

45 Claims, 12 Drawing Sheets

(56) References Cited

U.S. PATENT DOCUMENTS

| | | | | |
|---|---|---|---|---|
| 9,202,396 | B2* | 12/2015 | Mackler | G09F 11/025 |
| 9,812,896 | B2 | 11/2017 | Imperial | |
| 10,236,820 | B2 | 3/2019 | Schmidt | |
| 2004/0124711 | A1* | 7/2004 | Muchow | F24S 25/10 |
| | | | | 307/64 |
| 2010/0212659 | A1* | 8/2010 | Carpoff | H02S 30/20 |
| | | | | 126/627 |
| 2011/0146751 | A1* | 6/2011 | McGuire | F03D 9/007 |
| | | | | 136/245 |
| 2012/0025750 | A1* | 2/2012 | Margo | H02S 20/30 |
| | | | | 320/101 |
| 2012/0042936 | A1* | 2/2012 | Feichtinger | B60L 8/003 |
| | | | | 320/101 |
| 2013/0118099 | A1* | 5/2013 | Scanlon | H02J 7/00 |
| | | | | 136/246 |
| 2015/0090315 | A1 | 4/2015 | Spisak | |
| 2016/0294022 | A1* | 10/2016 | Thramann | B60L 53/63 |
| 2016/0344330 | A1* | 11/2016 | Gillis | H02S 20/32 |
| 2016/0352285 | A1* | 12/2016 | Seery | H02S 30/20 |
| 2017/0294873 | A1* | 10/2017 | Mori | H01L 31/0504 |
| 2018/0083567 | A1 | 3/2018 | Spisak | |
| 2019/0190440 | A1 | 6/2019 | Kingsley et al. | |
| 2019/0214937 | A1 | 7/2019 | Schmidt | |
| 2019/0351773 | A1 | 11/2019 | Merritt | |
| 2021/0284076 | A1* | 9/2021 | Prentice | H02S 10/40 |
| 2022/0077513 | A1* | 3/2022 | Thramann | H01M 10/465 |

FOREIGN PATENT DOCUMENTS

| | | |
|---|---|---|
| CN | 204068848 | 12/2014 |
| CN | 204118822 | 1/2015 |
| CN | 204361708 | 5/2015 |
| CN | 105322879 | 2/2016 |
| CN | 105515069 | 4/2016 |
| CN | 105922922 | 9/2016 |
| CN | 107472069 | 12/2017 |
| CN | 108809229 | 11/2018 |
| WO | 2018046883 | 3/2018 |

* cited by examiner

SOLAR POWERED CHARGING STATION

CROSS REFERENCE TO RELATED APPLICATIONS

This application is based upon and claims benefit of priority to US Provisional Application No. 62/790,288, filed Jan. 9, 2019, which application is hereby incorporated by reference herein.

FIELD OF THE INVENTION

This invention relates to standalone stations which use photovoltaic panels to generate and distribute electrical power.

BACKGROUND

Various advantages may be secured through the use of decentralized mobile and stationary power generating stations. Such stations are expected to benefit society by performing various functions enabled by the station's ability to generate, store and distribute electrical power in the absence of a significant carbon footprint. Benefits in everyday living, during emergencies, and in areas lacking infrastructure are expected to be realized.

SUMMARY

The invention concerns a station for generating and distributing electrical power. In an example embodiment the station comprises a first circuit. The first circuit may comprise at least one photovoltaic panel creating direct current electrical energy. A direct current collector is electrically connected to the at least one photovoltaic panel for receiving the direct current electrical energy. A terminal power draw unit is electrically connected to the direct current collector for conditioning the electrical energy for use. By way of example the terminal power draw unit may comprise an electrical power inverter for changing direct current to alternating current. In another example embodiment the terminal power draw unit may comprise a direct current to direct current converter for changing the direct current electrical energy from a first voltage to a second voltage different from the first voltage. By way of example, the direct current collector may be selected from the group consisting essentially of jumper cables, extensions from PV panel leads, wiring harness to combine PV panels in series or parallel, a combiner box to combine circuits, fuses or circuit breakers to provide circuit protection, wiring to connect DC collection system to charge controllers, wiring to connect PV panels to a terminal power draw unit and combinations thereof.

By way of example, the station according to the invention may further comprise a second circuit connected between the direct current collector and the terminal power draw unit in parallel with the first circuit. In an example embodiment the second circuit comprises a first electrical storage battery electrically connected in series with the direct current collector and the terminal power draw unit. A first electrical charge controller is electrically connected in series between the direct current collector and the first battery. A first blocking diode is electrically connected in series between the first battery and the terminal power draw unit. A second blocking diode may be electrically connected in series between the direct current collector and the terminal power draw unit in this example. An example station may further comprise a third circuit connected between the direct current collector and the terminal power draw unit in parallel with the first and the second circuits. By way of example the third circuit may comprise a second electrical storage battery electrically connected in series with the direct current collector and the terminal power draw unit. A second electrical charge controller is electrically connected in series between the direct current collector and the second battery in this example. A second blocking diode is electrically connected in series between the second battery and the terminal power draw unit in this example.

An example embodiment may further comprise a third blocking diode electrically connected in series between the direct current collector and the terminal power draw unit in the first circuit. By way of further example, a station may comprise a plurality of auxiliary circuits. Each auxiliary circuit may be connected in parallel with one another and the first circuit. Each auxiliary circuit may comprise an electrical storage battery electrically connected in series with the direct current collector and the terminal power draw unit, an electrical charge controller electrically connected in series between the direct current collector and the battery and a blocking diode electrically connected in series between the battery and the terminal power draw unit.

An example embodiment may further comprise a first circuit blocking diode electrically connected in series between the direct current collector and the terminal power draw unit in the first circuit. An example station embodiment may comprise a plurality of the photovoltaic panels. One or more of the photovoltaic panels may comprise bifacial photovoltaic panels.

An example station according to the invention may further comprise a base. A plurality of struts extend from the base, and the photovoltaic panels are mounted atop the struts. An example station may further comprise a crossbeam mounted on an end of the struts. A plurality of cantilever beams extend transversely to the cross beam. The photovoltaic panels are mounted between the cantilever beams. By way of example the base may further comprise a container. The direct current collector and the terminal power draw unit are positioned within the container. Further by way of example, at least one electrical storage battery is positioned within the container. At least one electrical charge controller may also be positioned within the container. At least one diode may be positioned within the container. In an example embodiment, ballast is positioned within the container. The photovoltaic panels may be angularly oriented with respect to one another.

The invention also encompasses a method of operating the station. In an example embodiment the method comprises:
 producing electrical energy using the at least one photovoltaic panel at a production voltage higher than a working voltage of the first battery; and
 supplying the electrical energy to the terminal power draw unit exclusively through the first circuit.

Additionally, the method may comprise:
 producing the electrical energy using the at least one photovoltaic panel at a production voltage higher than a working voltage of the first battery; and
 supplying a first portion of the electrical energy to the terminal power draw unit through the first circuit; and
 supplying a second portion of the electrical energy to the first electrical charge controller for charging the first battery.

An example method may further comprise supplying the second portion of the electrical energy to the terminal power draw unit through the second circuit while simultaneously supplying the first portion of the electrical energy to the terminal power draw unit. Additionally, the method, by way of example, may further comprise increasing the second portion of the electrical energy supplied through the second circuit as the first portion of the electrical energy supplied through the first circuit decreases.

In invention also includes a station for generating and distributing electrical power which, by way of example, comprises a first circuit, which comprises a source of electrical energy, a current collector electrically connected to the source of electrical energy for receiving the electrical energy, and a terminal power draw unit electrically connected to the current collector for conditioning the electrical energy and for use. In this example embodiment the source of electrical energy is selected from the group consisting essentially of a wind turbine, a water turbine, a photovoltaic panel, a human-powered stationary bicycle and combinations thereof.

The invention also encompasses a kit for a station for generating and distributing electrical power. An example kit comprises a container within which is positioned a first circuit. In an example embodiment the first circuit comprises a direct current collector electrically connectable to at least one photovoltaic panel and a terminal power draw unit electrically connected to the direct current collector for conditioning the electrical energy for use. The example kit may further comprise a second circuit connected between the direct current collector and the terminal power draw unit in parallel with the first circuit. The second circuit may be positioned within the container and may comprise a first electrical charge controller electrically connectable in series between the direct current collector and an electrical storage battery and a first blocking diode electrically connectable in series between the battery and the terminal power draw unit. Further by way of example, the kit may comprise an electrical storage battery electrically connectable in series with the direct current collector and the terminal power draw unit. A first and a second blocking diode positioned within the container may also be included in the kit. The first diode is electrically connected in the first circuit in series between the direct current collector and the terminal power draw unit, the second blocking diode is electrically connectable in series between the battery and the terminal power draw unit. An example kit according to the invention may further comprise at least one photovoltaic panel and a plurality of struts attachable to the container for supporting the at least one photovoltaic panel. Further by way of example, the kit may comprise a crossbeam mountable on an end of the struts and a plurality of cantilever beams mountable transversely to the cross beam. The at least one photovoltaic panel is mountable between the cantilever beams.

DETAILED DESCRIPTION

FIGS. 1, 1A, 2 and 2A show example embodiments 10 and 12, of a station for generating and distributing electrical power according to the invention. The structural aspects of stations 10 and 12 feature a base 14, in these examples comprising a frame 16 formed of prismatic members 18 having tubular and angle cross sections. A plurality of struts 20 extend from the base 14 which serve to support one or more photovoltaic (PV) panels 22. PV panels are advantageously bifacial, meaning that opposite faces 22a and 22b of each PV panel 22 generate electricity when exposed to light. The open strut structure is advantageous because it minimizes structural shadowing of the PV panels and thus permits both the upper face 22a and the lower face 22b of PV panels to receive maximum light exposure. Lower faces 22b receive reflected light from the ground and it is expected that supporting the PV panels at a height of about 9 feet (3 meters) will provide close to optimum exposure for sun angles experienced throughout a day.

Figure 1:
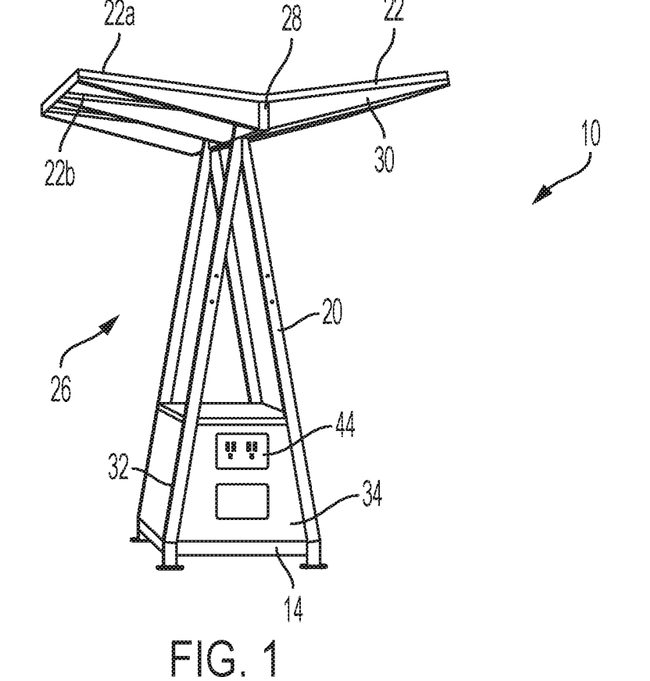
FIG. 1 is an isometric view of an example station for generating and distributing electrical power.
Figure 1A:
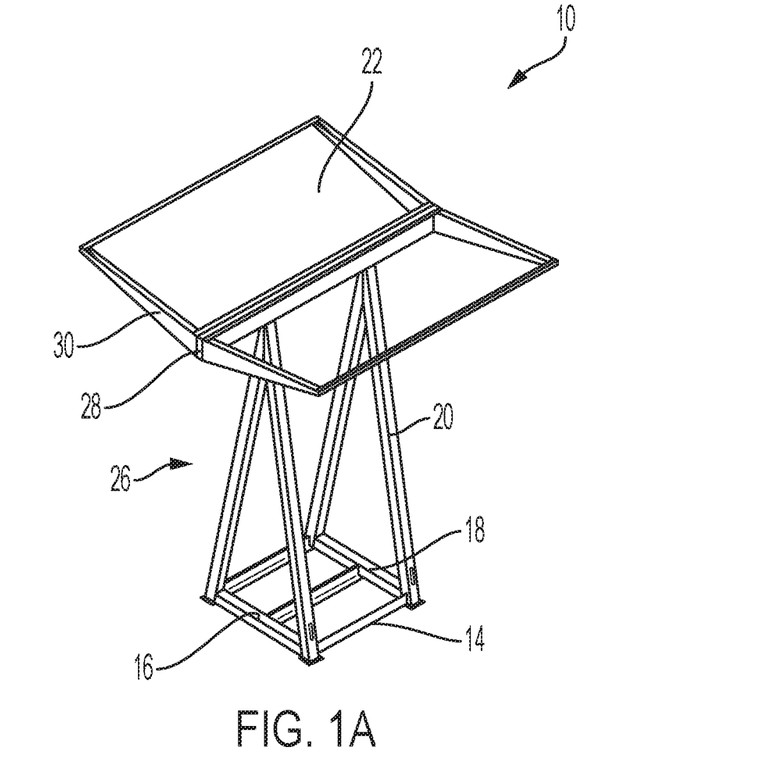
FIG. 1A is an isometric view of various structural components of the station shown in FIG. 1.
Figure 2:
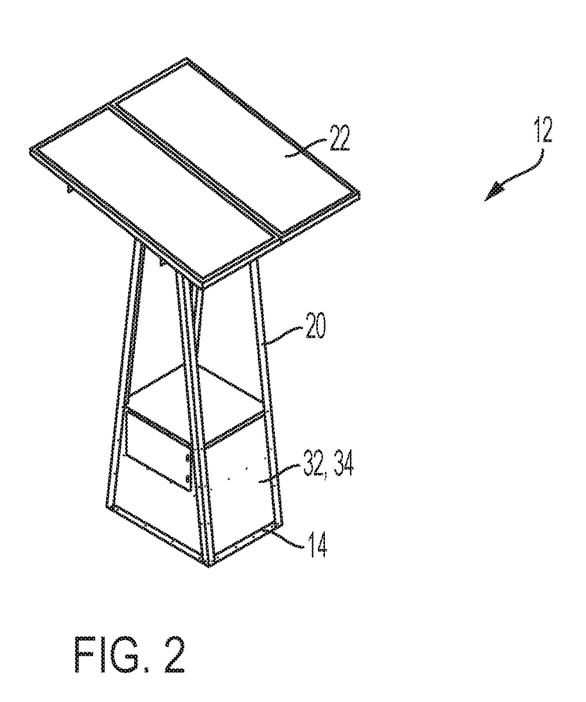
FIG. 2 is an isometric view of an example station for generating and distributing electrical power.
Figure 2A:
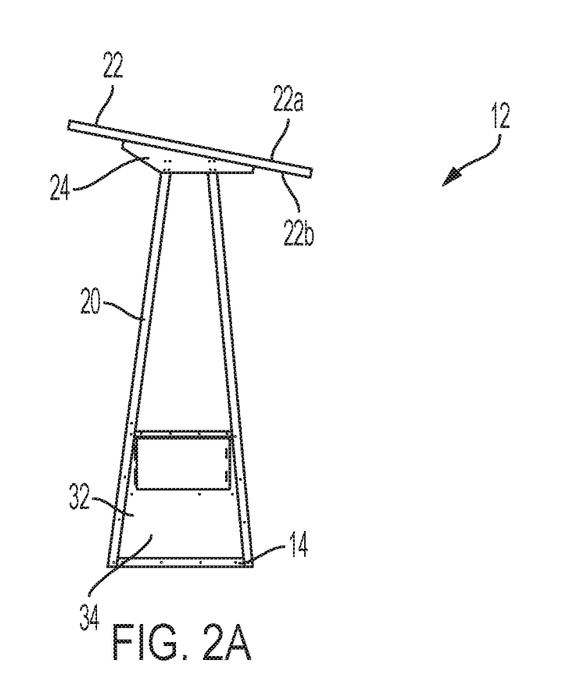
FIG. 2A is a side view of the station shown in FIG. 2.

As shown in FIGS. 2 and 2A, PV panels 22 may be directly mounted on the ends of the struts 20 using a bracket 24 as an interface between the struts 20 and the PV panels 22. Bracket 24 is advantageous because it can provide for angular orientation of the PV panels 22 as shown. Bracket 24 may also be angularly adjustable as well as rotatable to allow the PV panels to track the sun to maximize exposure. As shown in FIGS. 1 and 1A, struts 20 may be arranged in a truss structure 26 and one or more crossbeams 28 may be mounted on the ends of struts 20. Crossbeams 28 support a plurality of cantilever beams 30 which extend transversely to the crossbeams, the PV panels 22 being mounted between and supported by the cantilever beams 30. The crossbeam/cantilever design allows the PV panels 22 to be angularly oriented with respect to one another and facilitate snow melt and water drainage from the upper surfaces 22a of the PV panels 22.

Figure 3:
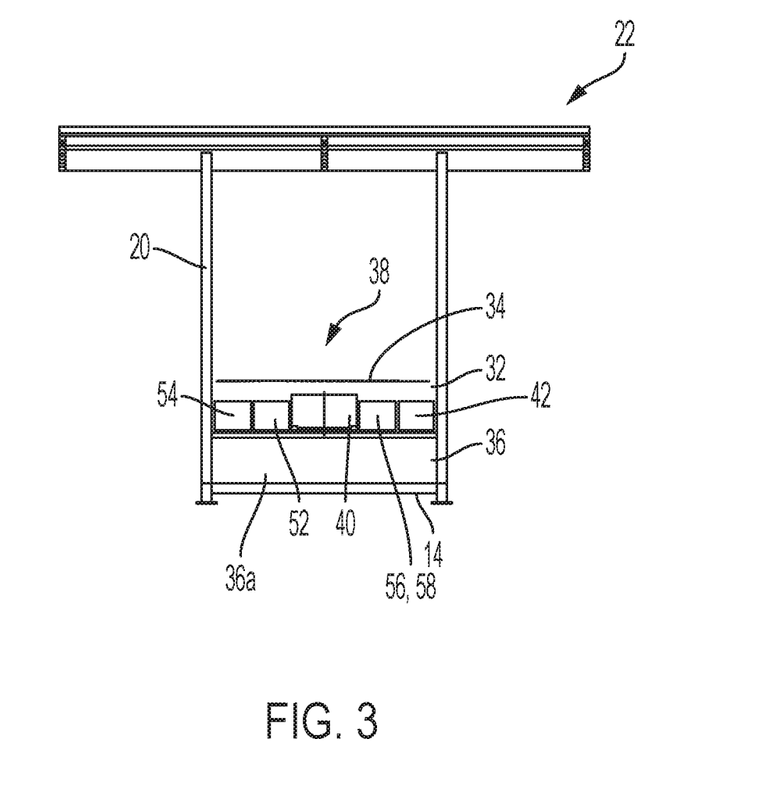
FIG. 3 is a partial sectional view of an example station for generating and distributing electrical power.

As shown in FIGS. 1, 2 and 3, base 14 of the stations 10 and 12 further comprises a container 32. In these examples container 32 is formed of plates 34 attached between the struts 20 to provide a weatherproof interior 36 which houses the electrical and electronic components 38 of the stations 10 and 12 (see FIG. 3). Container 32 also provides interior space 36a to receive ballast to stabilize the station against wind loads and other external forces. Ballast may comprise sand, soil, gravel or other heavy, bulk material. Advantageously, when the station is set up in a remote location, any readily available local bulk material may be used as ballast. Advantageously, in less remote locations, the station may be off-loaded from a delivery vehicle, fully-ballasted and ready-for-service, after being set in place by manual or automated pallet-jack.

Figure 4:
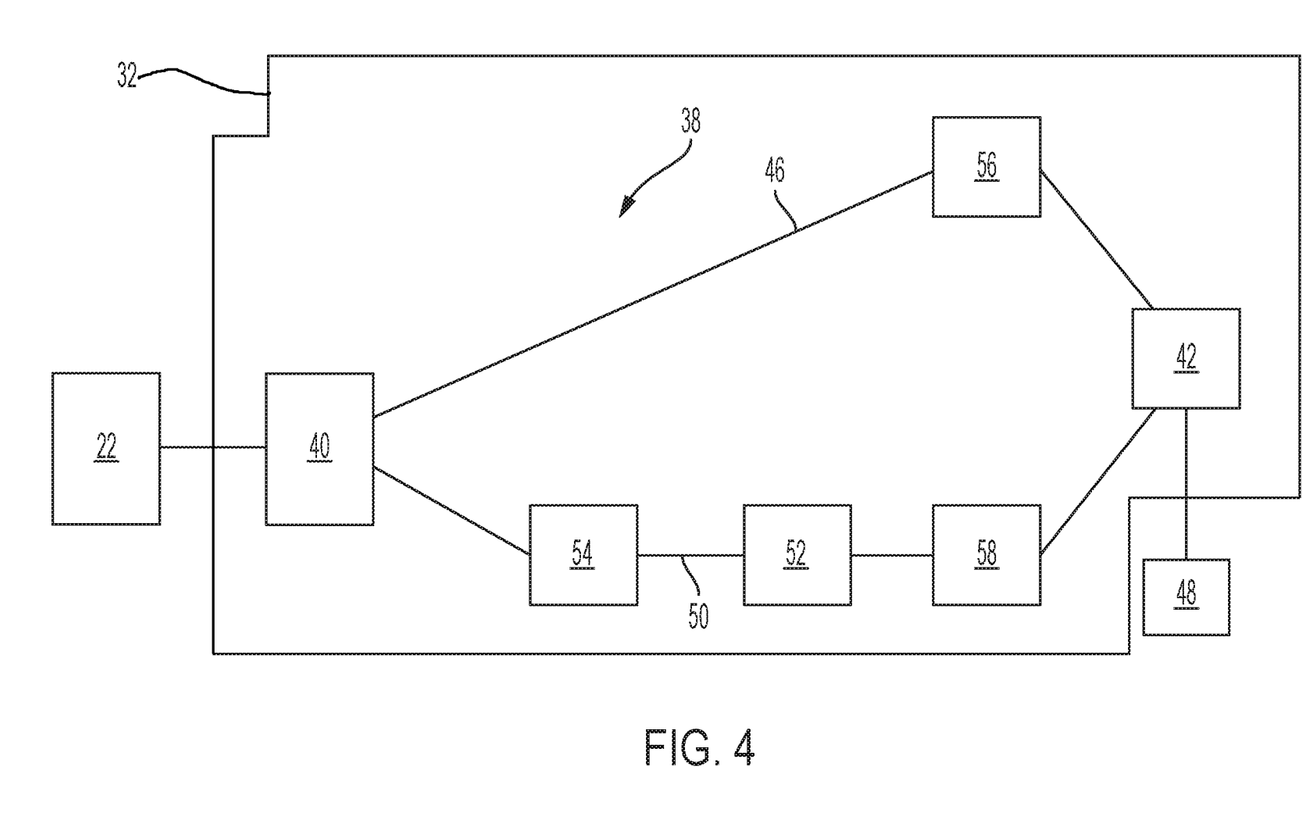
FIGS. 4 and 5 are schematic representations of example electrical circuits used in power generation and distribution stations according to the invention.

FIGS. 3 and 4 illustrate the electrical and electronic components of the stations 10 and 12, all of which may be located within container 32 as in this example. As shown in detail in FIG. 4, the PV panels 22 are electrically connected to a direct current (DC) collector 40. In an example embodiment, the DC collector 40 may comprise a wiring harness providing electrical connectivity between the PV panels and the other components of the collector 40, which comprise (any or all of):

1. jumper cables or extensions from PV panel leads;
2. a wire harness to combine PV panels in series or parallel;
3. a combiner box or fuse block to provide circuit protection and optionally combine circuits;
4. wiring to connect DC collection system to charge controllers and/or directly to the terminal power draw unit 42.

The DC collector 40 is electrically connected to a terminal power draw unit 42 through one or more circuits described below. The terminal power draw unit 42 may comprise, for example, an electrical power inverter for changing direct current into alternating current. The terminal power draw unit 42 may also or alternately comprise a direct current to direct current (DC to DC) converter for changing direct current electrical energy from a first voltage to a second voltage different from the first voltage. For example, the DC to DC converter may take the DC current from the PV panels at a high voltage and convert it to a lower DC voltage useful to charge batteries or run appliances. In an example embodiment, output from the terminal power draw unit 42 may be made available via a plurality of electrical outlets 44 mounted on the container 32 (see FIG. 1).

Figure 5:
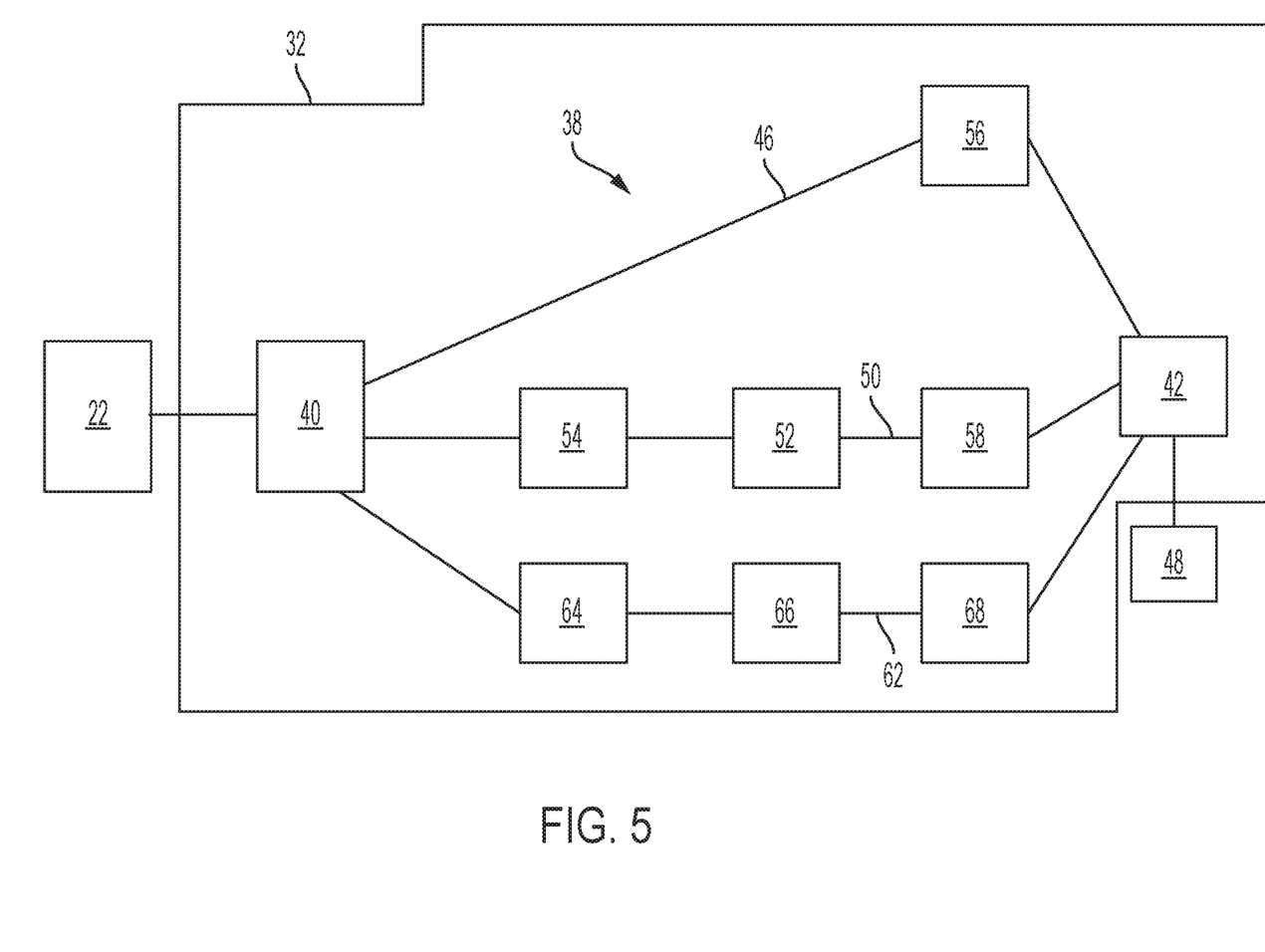

FIGS. 4 and 5 illustrate example circuits within container 32 connecting the PV panels 22 to the terminal power draw unit 42. As shown in FIG. 4, the DC collector 40 is connected directly to the terminal power draw unit 42 via a first circuit 46. The first circuit 46 permits electrical energy created continuously and in real time by the PV panels to flow directly to an appliance 48 connected to the terminal power draw unit 42. Thus batteries could be charged and radios could be run when the PV panels 22 are exposed to sunlight during daylight hours. FIG. 4 also shows a second circuit 50 which may be used in conjunction with the first circuit 46 to connect the PV panels to the terminal power draw unit 42. Second circuit 50 comprises an electrical storage battery 52 (for example, a rechargeable lead-acid battery) electrically connected in series between the DC collector 40 and the terminal power draw unit 42. An electrical charge controller 54 is electrically connected in series between the DC collector 40 and the battery 52 for conditioning the electrical voltage and current to the battery to ensure proper charging. When the first and second circuits 46 and 50 are connected in parallel between the DC collector 40 and the terminal power draw unit 42 it is advantageous to use respective first and second blocking diodes 56 and 58 in series in the first and second circuits 46 and 50 to allow current flow only from the DC collector 40 to the terminal power draw unit 42 and thereby protect each circuit 46 and 50 and prevent current from flowing back to the PV panels. The combination first and second circuits 46 and 50 allow a method of operation according to the invention to be employed as described below. FIG. 5 shows a third circuit 62 arranged in parallel with the first and second circuits 46 and 50 between the DC collector 40 and the terminal power draw unit 42. Third circuit 62 in this example is also a battery charging circuit like the second circuit 50 and comprises an electrical charge controller 64, an electrical storage battery 66 and a third blocking diode 68 connected in series. The use of parallel first and second circuits 46 and 50 ensures continued operation of the station in the event of a failure of the charge controller 54 or its battery 52 as long as the PV panels are producing electricity. The use of a third, battery charging circuit 62 in parallel provides redundancy against failure to ensure station operation when the PV panels are inactive.

Figure 6:
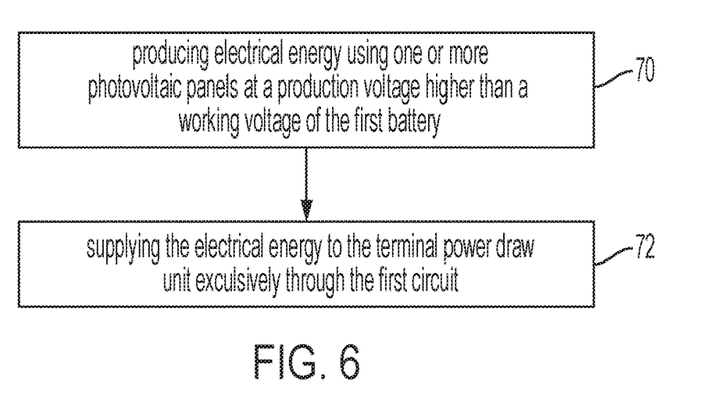
FIGS. 6 and 7 are flow charts illustrating example methods of operating power generation and distribution stations according to the invention.

The use of the parallel circuit configuration permits stations 10 and 12 to operate according to an example method, illustrated in FIG. 6, which comprises:

producing electrical energy using one or more photovoltaic panels at a production voltage higher than a working voltage of the first battery (70); and supplying the electrical energy to the terminal power draw unit exclusively through the first circuit (72).

Figure 7:
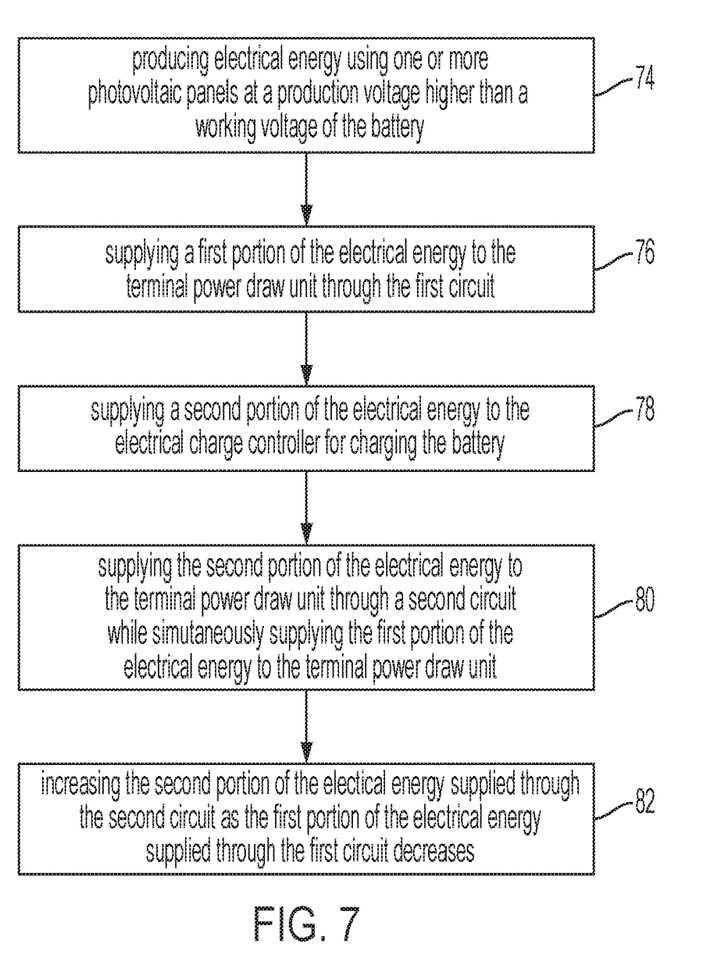

Alternate method steps of the example method according to the invention, shown in FIG. 7, comprise:

producing electrical energy using one or more photovoltaic panels at a production voltage higher than a working voltage of the battery (74); and supplying a first portion of the electrical energy to the terminal power draw unit through the first circuit (76); and supplying a second portion of the electrical energy to the electrical charge controller for charging the battery (78).

Another method step comprises supplying the second portion of the electrical energy to the terminal power draw unit through a second circuit while simultaneously supplying the first portion of the electrical energy to the terminal power draw unit (80).

A further method step comprises increasing the second portion of the electrical energy supplied through the second circuit as the first portion of the electrical energy supplied through the first circuit decreases (82).

Figure 8:
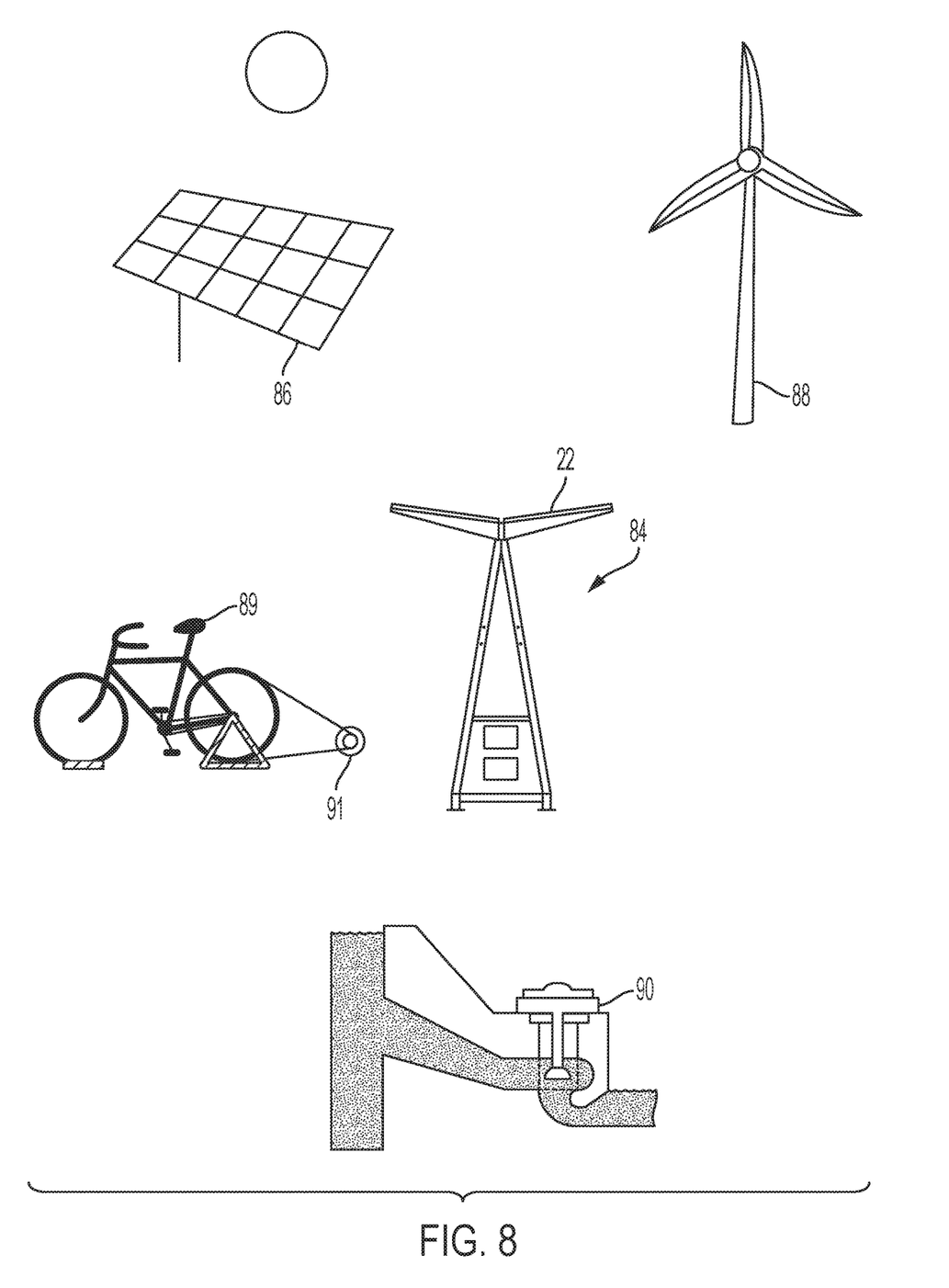
FIG. 8 is a schematic representation of another example embodiment of a power generating and distribution station.

The parallel circuit configurations 46, 50 and 62 used with the stations 10 and 12 have broader application as shown in FIG. 8, wherein any source, or combination of sources, of electrical energy may be used by a station 84 having the circuitry according to the invention. In the example shown, station 84 may receive electrical energy from PV panels, local to the station (22) and/or remote therefrom (86), and/or from a wind turbine 88, and/or a water turbine 90, as well as one or more human-powered stationary bicycles 89 turning a generator 91.

The invention further encompasses a kit for constructing stations 10 and 12 for generating and distributing electrical power. The object of the kit is to provide station components which are easy to transport, for example by individuals or pack animals, and easy to assemble manually with few tools. A kit is thus ideal for establishing an electrical power source in remote locations which are difficult to access and which are not served by an electrical grid.

In one example embodiment, the kit comprises the container 32 within which is positioned the first circuit 46. The kit may also include within the container 32 the second circuit 50 and additional similar circuits arranged in parallel with the first circuit 46. The electrical storage battery 52, electrically connectable in series with the electrical charge controller 54 and the terminal power draw unit 42, may also be part of the kit, but it may be supplied separately and installed in the container 32 during assembly of the station. Separately supplying the battery allows the container to be relatively light weight and easier to transport. When charging circuits like second circuits 50 are in the container 32 the first and second blocking diodes 58 and 60 are also part of the kit and positioned within the container 32. The kit may comprise one or more PV panels 22 and a plurality of struts 20, crossbeams 28, cantilever beams 30 and brackets 24 attachable to the container 32 for supporting the photovoltaic panel or panels. The structural support members may be packaged in manageable units for easy transport.

Figure 9:
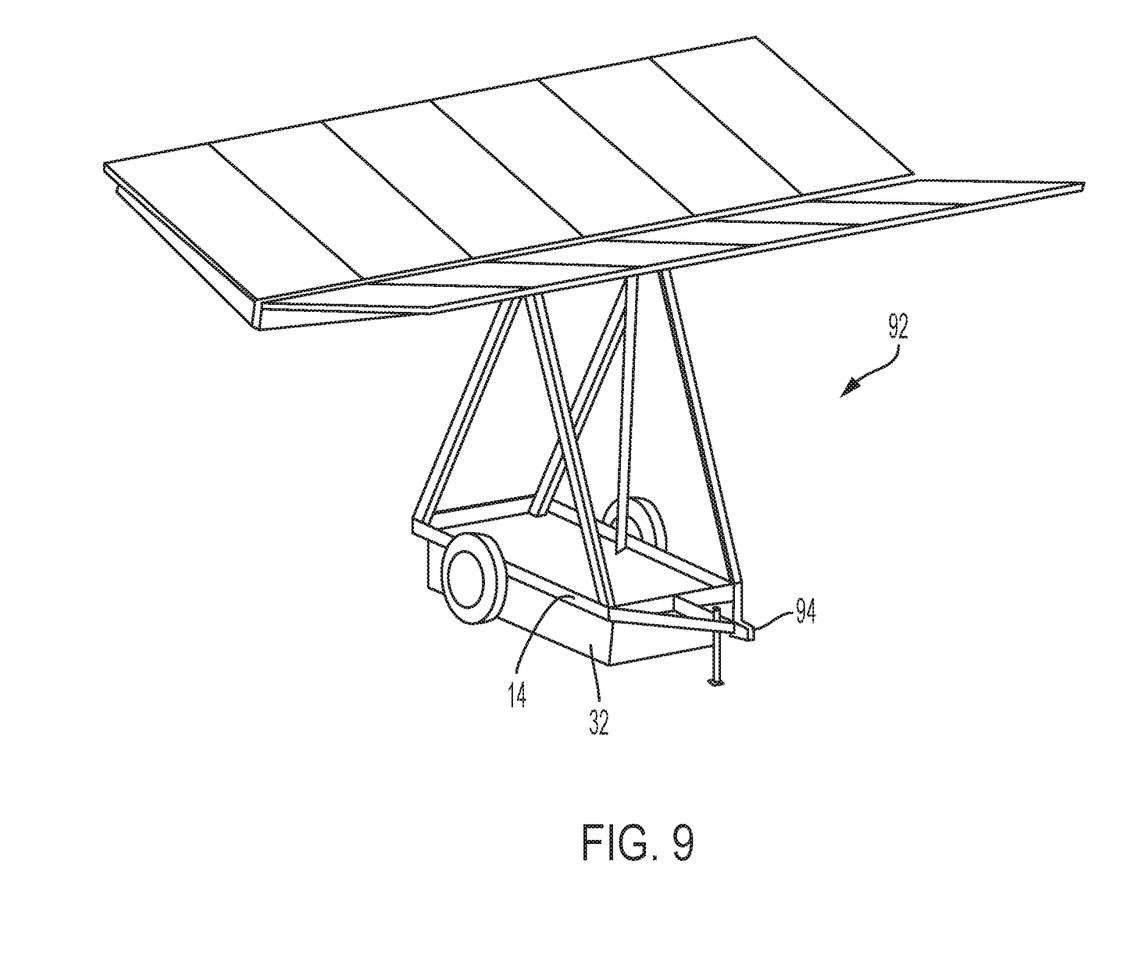
FIGS. 9 and 10 are an isometric views of trailered power generation and distribution stations.
Figure 10:
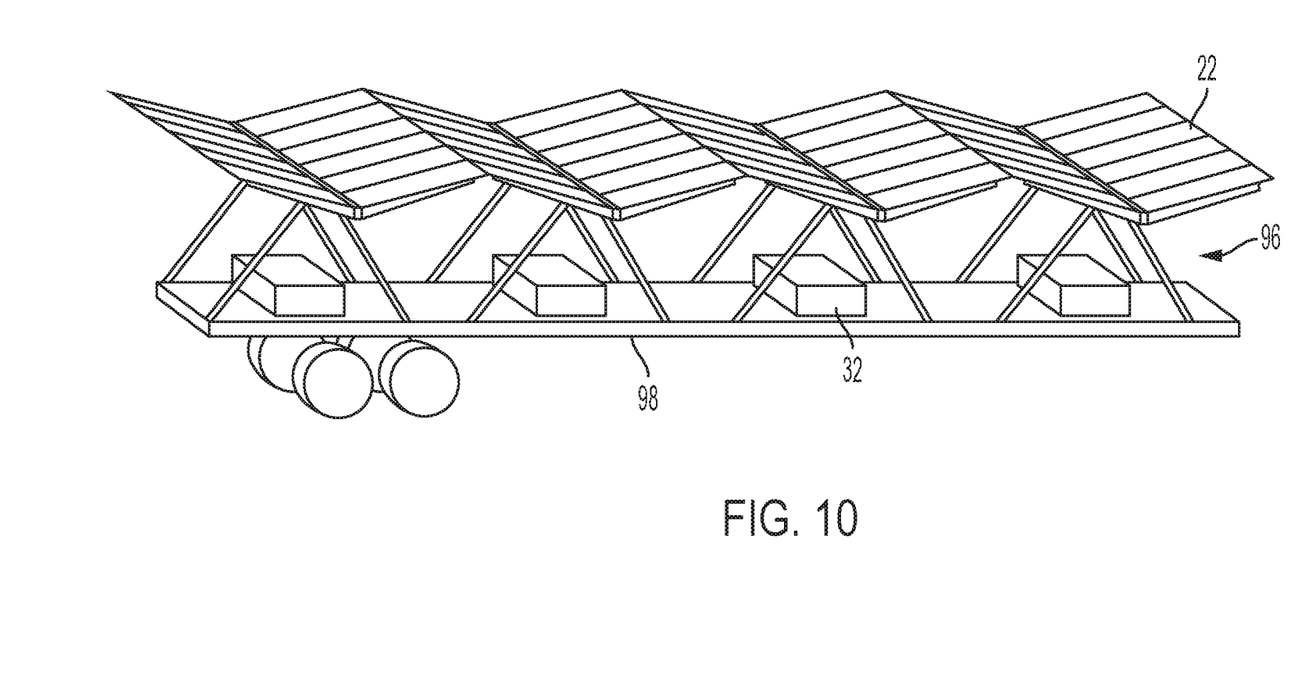
Figure 11:
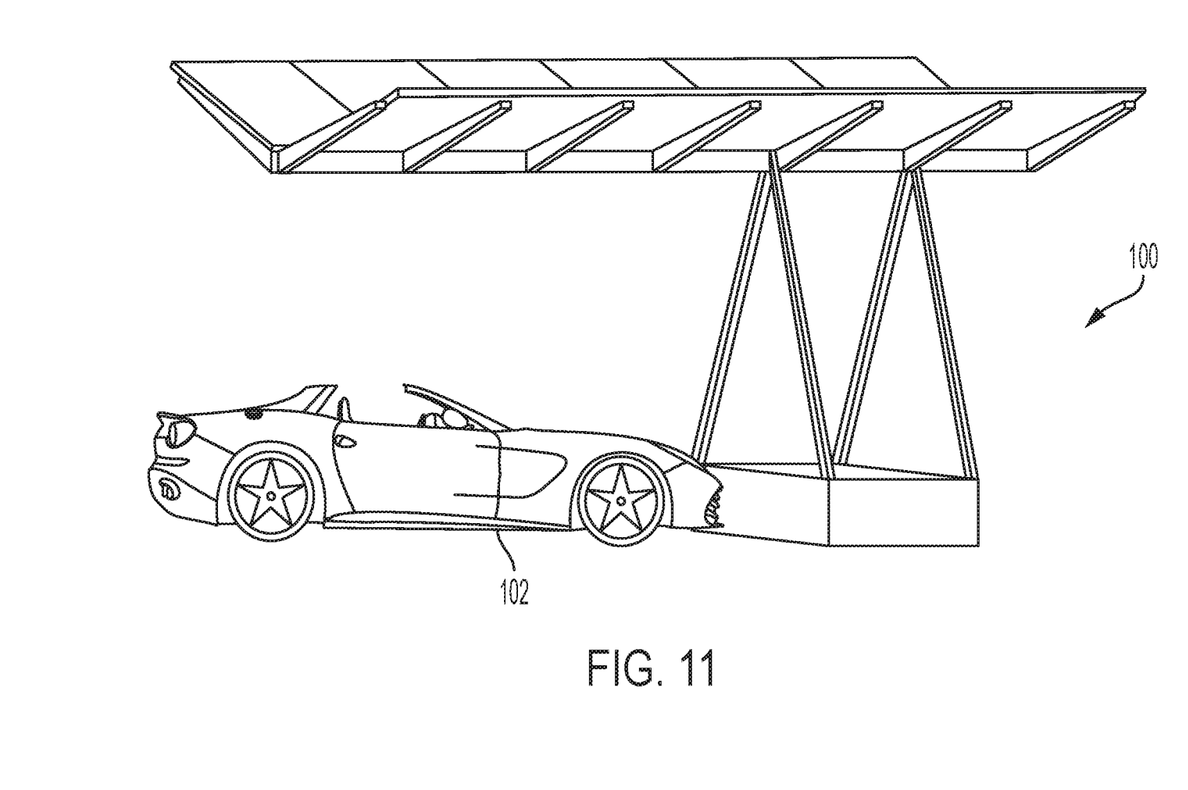
FIGS. 11 and 12 are isometric views of power generation and distribution stations in use for recharging electrical vehicles.
Figure 12:
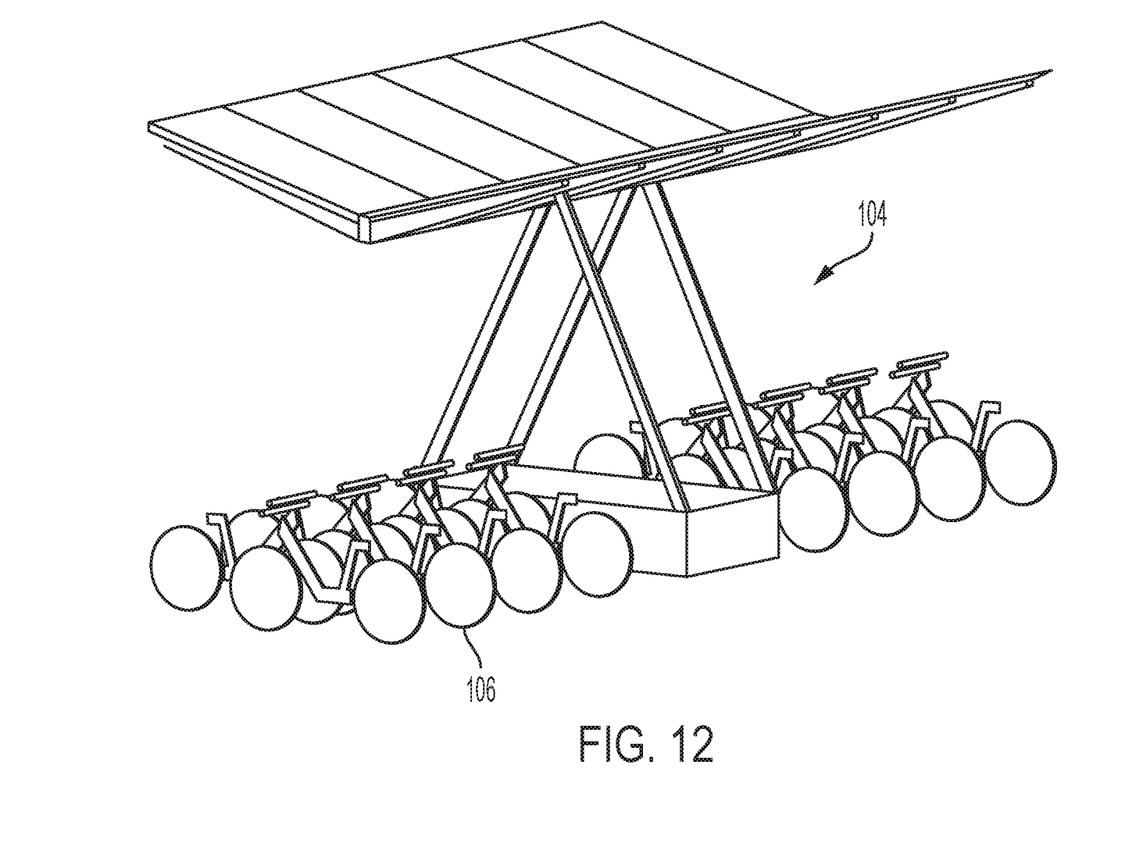
Figure 13:
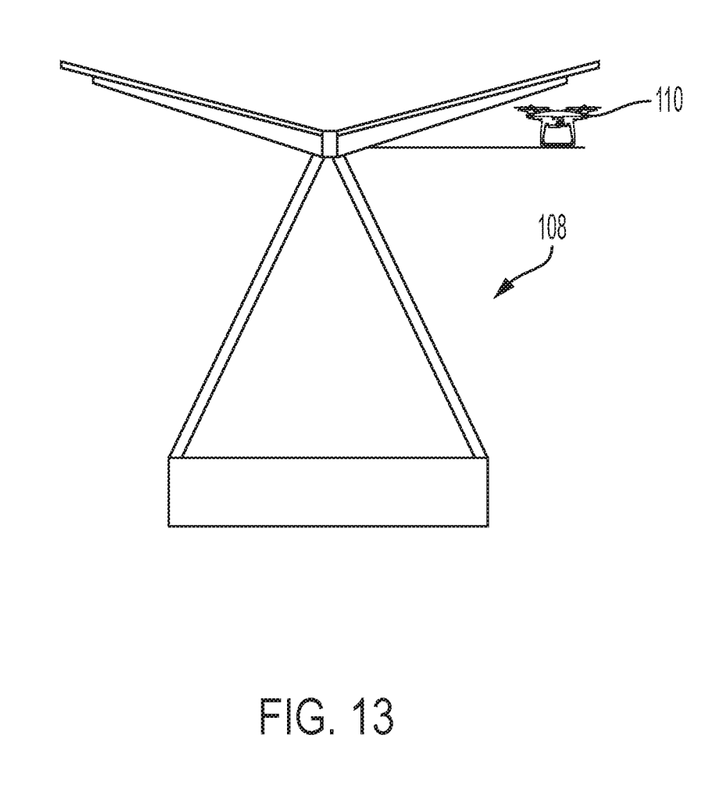
FIG. 13 is an elevation view of a power generation and distribution station serving as a landing and charging platform for unmanned aerial vehicles.

Stations 10 and 12 according to the invention may assume additional embodiments and functions. FIG. 9 shows an example mobile station 92 wherein the base 14 and container 32 are mounted on a wheeled trailer 94. The station 92 can be towed by a prime mover and setup where needed. For practical towing it is advantageous to stow the PV panels 22 and this may be accomplished in any of a number of ways. Where more power is required a plurality of stations 96 may be mounted on a semi-trailer 98 as shown in FIG. 10. FIGS. 11-13 illustrate example stations in use. FIG. 11 shows a combination carport charging station 100 for an electrical vehicle 102; FIG. 12 shows a charging and parking station 104 for charging and organizing electrical bicycles 106; FIG. 13 shows a recharging/landing platform 108 for autonomous drones 110. Stations 108 could be part of a collection and distribution center for package delivery services, incorporating electrically powered autonomous terrestrial vehicles in addition to the aerial vehicles.

Power generating stations according to the invention would be virtually unlimited in their application and benefit to society. For example, the angled PV panels 22 may be used to collect rainwater and direct it to a filtration unit on the station, or direct it to adjacent storage tanks or planters. Toilet facilities could be integrated into a station to provide self-powered public restroom facilities with containment and/or waste treatment tanks and/or bio-digesting fuel production units. The stations could be used in a system to manage carbon credits by verifying carbon saving behavior, such as recording bicycle trips between stations. Such carbon credits might be sold on the open market, or used to support transactions with local businesses.

Stations according to the invention are currently envisioned as advantageously operating at either 12 volts or 24 volts, although other configurations operating at other voltages are of course feasible. In an example embodiment, a 12 volt station according to the invention is expected to supply a total of 350 watts, photovoltaic peak power DC, have a storage capacity of 756 watt-hours and support a peak device power draw of 315 watts through 30 USB plugs. Further by way of example, a 24 volt station according to the invention is expected to supply a total of 770 watts, photovoltaic peak power DC, have a storage capacity of 2376 watt-hours and a peak device power device power draw of 525 watts through 50 USB plugs. These performance predictions assume 5 sun-hours per day using PV panels of 2-4 square meters surface area and 20% efficiency, a charge controller efficiency of 0.95, battery round trip efficiency of 0.8 for a 27 watt-hour battery.

What is claimed is:

1. A station for generating and distributing electrical power, said station comprising a first circuit and a second circuit, said first circuit comprising:
   at least one photovoltaic panel creating direct current electrical energy;
   a direct current collector electrically connected to said at least one photovoltaic panel for receiving said direct current electrical energy;
   a terminal power draw unit electrically connected to said direct current collector for conditioning said electrical energy for use;
   said second circuit being connected between said direct current collector and said terminal power draw unit in parallel with said first circuit, said second circuit comprising:
   a first electrical storage battery electrically connected in series with said direct current collector and said terminal power draw unit;
   a first electrical charge controller electrically connected in series between said direct current collector and said first battery;
   a first blocking diode electrically connected in series between said first battery and said terminal power draw unit.

2. The station according to claim 1, wherein said terminal power draw unit comprises an electrical power inverter for changing direct current to alternating current.

3. The station according to claim 1, wherein said terminal power draw unit comprises a direct current to direct current converter for changing said direct current electrical energy from a first voltage to a second voltage different from said first voltage.

4. The station according to claim 1, wherein said direct current collector is selected from the group consisting essentially of jumper cables, extensions from PV panel leads, wiring harness to combine PV panels in series or parallel, a combiner box to combine circuits, fuses, circuit breakers to provide circuit protection, wiring to connect PV panels to a terminal power draw unit and combinations thereof.

5. The station according to claim 1, further comprising a second blocking diode electrically connected in series between said direct current collector and said terminal power draw unit.

6. The station according to claim 1, further comprising:
   a third circuit connected between said direct current collector and said terminal power draw unit in parallel with said first and said second circuits, said third circuit comprising:
   a second electrical storage battery electrically connected in series with said direct current collector and said terminal power draw unit;
   a second electrical charge controller electrically connected in series between said direct current collector and said second battery;
   a second blocking diode electrically connected in series between said second battery and said terminal power draw unit.

7. The station according to claim 6, further comprising a third blocking diode electrically connected in series between said direct current collector and said terminal power draw unit in said first circuit.

8. A method of operating the station according to claim 1, said method comprising:
   producing said electrical energy using said at least one photovoltaic panel at a production voltage higher than a working voltage of said first battery; and
   supplying said electrical energy to said terminal power draw unit exclusively through said first circuit.

9. A method of operating the station according to claim 1, said method comprising:
   producing said electrical energy using said at least one photovoltaic panel at a production voltage higher than a working voltage of said first battery; and
   supplying a first portion of said electrical energy to said terminal power draw unit through said first circuit;
   supplying a second portion of said electrical energy to said first electrical charge controller for charging said first battery.

10. The method according to claim 9, further comprising supplying said second portion of said electrical energy to said terminal power draw unit through said second circuit while simultaneously supplying said first portion of said electrical energy to said terminal power draw unit.

11. The method according to claim 10, further comprising increasing said second portion of said electrical energy supplied through said second circuit as said first portion of said electrical energy supplied through said first circuit decreases.

12. The station according to claim 1, further comprising a plurality of auxiliary circuits, each said auxiliary circuit connected in parallel with one another and said first circuit, each said auxiliary circuit comprising:
an electrical storage battery electrically connected in series with said direct current collector and said terminal power draw unit;
an electrical charge controller electrically connected in series between said direct current collector and said battery;
a blocking diode electrically connected in series between said battery and said terminal power draw unit.

13. The station according to claim 12, further comprising a first circuit blocking diode electrically connected in series between said direct current collector and said terminal power draw unit in said first circuit.

14. The station according to claim 1, further comprising a plurality of said photovoltaic panels.

15. The station according to claim 14, further comprising:
a base;
a plurality of struts extending from said base, wherein said photovoltaic panels are mounted atop said struts.

16. The station according to claim 15, further comprising:
a crossbeam mounted on an end of said struts;
a plurality of cantilever beams extending transversely to said cross beam, said photovoltaic panels being mounted between said cantilever beams.

17. The station according to claim 16, wherein said photovoltaic panels are angularly oriented with respect to one another.

18. The station according to claim 15, wherein said base comprises a container.

19. The station according to claim 18, wherein said direct current collector and said terminal power draw unit are positioned within said container.

20. The station according to claim 18, wherein at least one electrical storage battery is positioned within said container.

21. The station according to claim 18, wherein at least one electrical charge controller is positioned within said container.

22. The station according to claim 18, wherein at least one diode is positioned within said container.

23. The station according to claim 18, wherein ballast is positioned within said container.

24. The station according to claim 1, wherein said at least one photovoltaic panel comprises a bifacial photovoltaic panel.

25. A station for generating and distributing electrical power, said station comprising a first circuit and a second circuit, said first circuit comprising:
a source of electrical energy;
a current collector electrically connected to said source of electrical energy for receiving said electrical energy;
a terminal power draw unit electrically connected to said current collector for conditioning said electrical energy and for use;
said second circuit being connected between said current collector and said terminal power draw unit in parallel with said first circuit, said second circuit comprising:
a first electrical storage battery electrically connected in series with said current collector and said terminal power draw unit;
a first electrical charge controller electrically connected in series between said current collector and said first battery;
a first blocking diode electrically connected in series between said first battery and said terminal power draw unit.

26. The station according to claim 25, wherein said source of electrical energy is selected from the group consisting essentially of a wind turbine, a water turbine, a photovoltaic panel, a human-powered stationary bicycle and combinations thereof.

27. The station according to claim 25, wherein said terminal power draw unit comprises an electrical power inverter for changing direct current to alternating current.

28. The station according to claim 25, wherein said terminal power draw unit comprises a direct current to direct current converter for changing said direct current electrical energy from a first voltage to a second voltage different from said first voltage.

29. The station according to claim 25, wherein said direct current collector is selected from the group consisting essentially of jumper cables, extensions from PV panel leads, wiring harness to combine PV panels in series or parallel, a combiner box to combine circuits, fuses, circuit breakers to provide circuit protection, wiring to connect DC collection system to charge controllers, wiring to connect PV panels to a terminal power draw unit and combinations thereof.

30. The station according to claim 25, further comprising a second blocking diode electrically connected in series between said current collector and said terminal power draw unit.

31. The station according to claim 25, further comprising:
a third circuit connected between said current collector and said terminal power draw unit in parallel with said first and said second circuits, said third circuit comprising:
a second electrical storage battery electrically connected in series with said current collector and said terminal power draw unit;
a second electrical charge controller electrically connected in series between said current collector and said second battery;
a second blocking diode electrically connected in series between said second battery and said terminal power draw unit.

32. The station according to claim 31, further comprising a third blocking diode electrically connected in series between said current collector and said terminal power draw unit in said first circuit.

33. A method of operating the station according to claim 25, said method comprising:
producing said electrical energy using said at least one photovoltaic panel at a production voltage higher than a working voltage of said first battery; and
supplying said electrical energy to said terminal power draw unit exclusively through said first circuit.

34. A method of operating the station according to claim 25, said method comprising:
producing said electrical energy using said at least one photovoltaic panel at a production voltage higher than a working voltage of said first battery; and supplying a first portion of said electrical energy to said terminal power draw unit through said first circuit;

supplying a second portion of said electrical energy to said first electrical charge controller for charging said first battery.

35. The method according to claim 34, further comprising supplying said second portion of said electrical energy to said terminal power draw unit through said second circuit while simultaneously supplying said first portion of said electrical energy to said terminal power draw unit.

36. The method according to claim 35, further comprising increasing said second portion of said electrical energy supplied through said second circuit as said first portion of said electrical energy supplied through said first circuit decreases.

37. The station according to claim 25, further comprising a plurality of auxiliary circuits, each said auxiliary circuit connected in parallel with one another and said first circuit, each said auxiliary circuit comprising:
- an electrical storage battery electrically connected in series with said current collector and said terminal power draw unit;
- an electrical charge controller electrically connected in series between said current collector and said battery;
- a blocking diode electrically connected in series between said battery and said terminal power draw unit.

38. The station according to claim 37, further comprising a first circuit blocking diode electrically connected in series between said current collector and said terminal power draw unit in said first circuit.

39. A kit for a station for generating and distributing electrical power, said kit comprising:
- a container within which is positioned a first circuit and a second circuit, said first circuit comprising:
- a direct current collector electrically connectable to at least one photovoltaic panel;
- a terminal power draw unit electrically connected to said direct current collector for conditioning said electrical energy for use;
- said second circuit being connected between said direct current collector and said terminal power draw unit in parallel with said first circuit, said second circuit comprising:
- a first electrical charge controller electrically connectable in series between said direct current collector and an electrical storage battery;
- a first blocking diode electrically connectable in series between said battery and said terminal power draw unit.

40. The kit according to claim 39, further comprising an electrical storage battery electrically connectable in series with said direct current collector and said terminal power draw unit.

41. The kit according to claim 40, further comprising a first and a second blocking diode positioned within said container, said first diode being electrically connected in said first circuit in series between said direct current collector and said terminal power draw unit, said second blocking diode being electrically connectable in series between said battery and said terminal power draw unit.

42. The kit according to claim 39, further comprising:
- at least one photovoltaic panel;
- a plurality of struts attachable to said container for supporting said at least one photovoltaic panel.

43. The kit according to claim 42, further comprising:
- a crossbeam mountable on an end of said struts;
- a plurality of cantilever beams mountable transversely to said cross beam, said at least one photovoltaic panel being mountable between said cantilever beams.

44. A station for generating and distributing electrical power, said station comprising a first circuit and a plurality of auxiliary circuits, said first circuit comprising:
- at least one photovoltaic panel creating direct current electrical energy;
- a direct current collector electrically connected to said at least one photovoltaic panel for receiving said direct current electrical energy;
- a terminal power draw unit electrically connected to said direct current collector for conditioning said electrical energy for use; wherein
- each said auxiliary circuit is connected in parallel with one another and said first circuit, each said auxiliary circuit comprising:
- an electrical storage battery electrically connected in series with said direct current collector and said terminal power draw unit;
- an electrical charge controller electrically connected in series between said direct current collector and said battery;
- a blocking diode electrically connected in series between said battery and said terminal power draw unit.

45. A station for generating and distributing electrical power, said station comprising a first circuit and a plurality of auxiliary circuits, said first circuit comprising:
- a source of electrical energy;
- a current collector electrically connected to said source of electrical energy for receiving said electrical energy;
- a terminal power draw unit electrically connected to said current collector for conditioning said electrical energy and for use; wherein
- each said auxiliary circuit is connected in parallel with one another and said first circuit, each said auxiliary circuit comprising:
- an electrical storage battery electrically connected in series with said current collector and said terminal power draw unit;
- an electrical charge controller electrically connected in series between said current collector and said battery;
- a blocking diode electrically connected in series between said battery and said terminal power draw unit.

\* \* \* \* \*